July 24, 1962 C. B. BRAHM 3,045,426
CONTROL SYSTEM HAVING AN AMPLIFIER WITH VARIABLE SENSITIVITY
Filed June 21, 1955 2 Sheets-Sheet 1
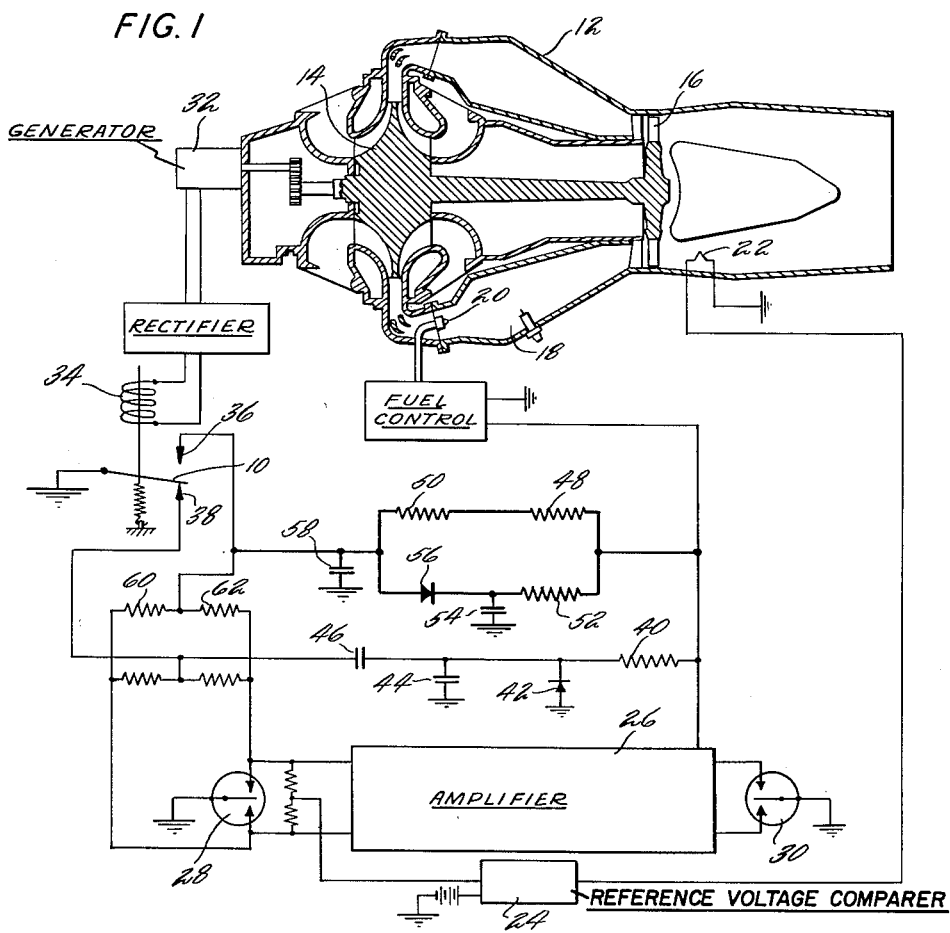
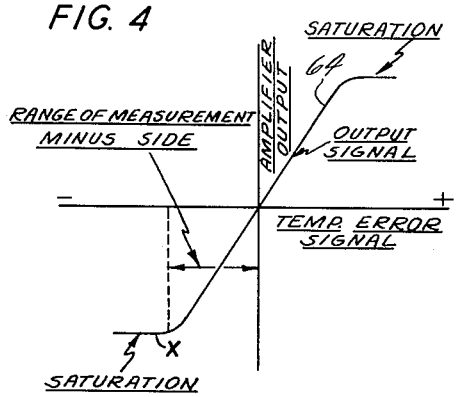
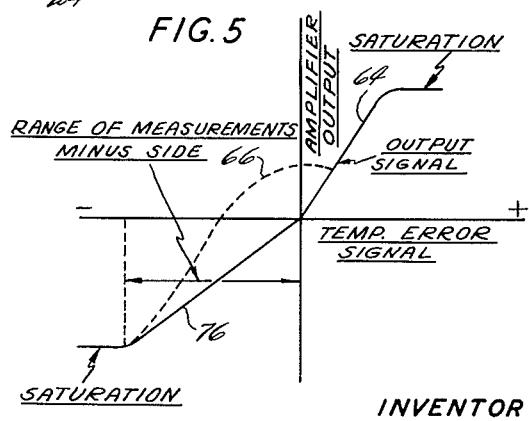
INVENTOR
CHARLES B. BRAHM
BY Harris G. Luther
ATTORNEY

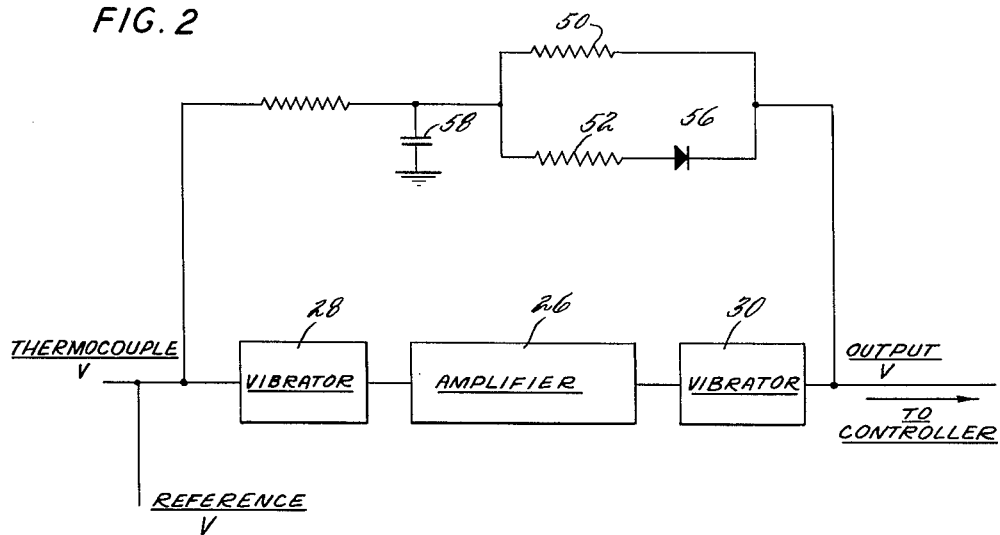
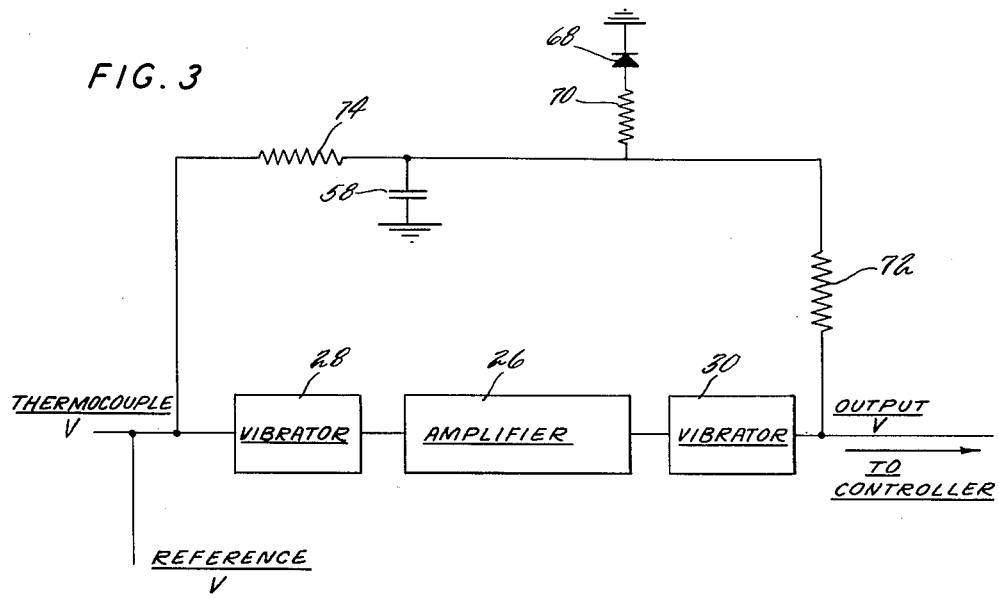

United States Patent Office 3,045,426
Patented July 24, 1962

3,045,426
CONTROL SYSTEM HAVING AN AMPLIFIER WITH VARIABLE SENSITIVITY
Charles B. Brahm, Windsor Locks, Conn., assignor to United Aircraft Corporation, East Hartford, Conn., a corporation of Delaware
Filed June 21, 1955, Ser. No. 517,000
10 Claims. (Cl. 60—39.28)

This invention relates to control means and particularly to temperature responsive fuel control means for limiting engine temperature.

More specifically, it relates to mechanism, effective during the starting of a gas turbine, utilizing a temperature error signal to reduce fuel flow in response to temperature increases, particularly below a preselected temperature limit, to prevent or reduce overshooting of temperature limits.

The invention has been applied to an electronic fuel control, utilizing an amplifier amplifying the control signal and having a feed back circuit including an anticipating condenser in the feedback.

An object of this invention is a control which has a lower sensitivity i.e., ratio of output signal to input signal below the control point than above the control point.

A further object is mechanism which will provide an effective increase in the available response time of a thermocouple or other pick-up elements.

A further object is a control circuit including an anticipating feature and having means for changing the sensitivity i.e., ratio of output signal to input signal of the control circuit on opposite sides of the critical point in a selected control parameter.

A still further object is a control circuit including an amplifier having a negative feed back and including a rectifier in the feed back circuit to change the resistance in the feed back as the amplifier output signals change polarity.

Further objects and advantages will be apparent from the specification and claims, and from the accompanying drawings which illustrate the now preferred embodiment of the invention.

FIG. 1 is a schematic diagram showing the invention applied to a temperature responsive fuel control for a turbine.

FIG. 2 is a schematic diagram showing a modification of the invention of FIG. 1, omitting the grounded condenser in the rectifier circuit.

FIG. 3 is a further modification of the invention shown in FIG. 1 illustrating an alternate method of providing changes in the feedback circuit with changes in polarity.

FIG. 4 is a graph showing a fuel control output signal utilizing an ordinary feedback signal.

FIG. 5 is a graph showing a fuel control output signal utilizing the low-resistance negative-signal parallel feedback path.

The present invention has been shown as applied to a fuel control of the type shown in application Serial No. 496,588, filed March 24, 1955, by Stanley G. Best and Charles B. Brahm to which reference may be made for details of the fuel control and the thermocouple and amplifier circuits. The present invention relates primarily to a modification of the feed back circuit of the amplifier of said application. While this description relates to temperature measurement by means of a thermocouple, it will be evident that the invention is equally adaptable to other types of pick-up elements of other variables.

The invention of this application forms a part of a control circuit for limiting the fuel flow to a turbine engine. The particular mechanism involved here is not capable of increasing fuel flow and acts as part of an override to reduce fuel flow and the reduction of fuel flow is only for the purpose of preventing overheating of the turbine parts. As long as the output of the amplifier 26 is negative or zero, it will have no effect on fuel flow.

The particular structure and circuits in which the present circuit is incorporated provide two regimes of operation, the first regime and the one to which this invention relates, is the starting regime and the circuit described hereinafter is used during the starting regime to prevent or reduce overshooting of the temperature limits during the rapid rise of temperature in the starting of the turbine. As shown in FIG. 1, a switch 10, which will be described in more detail later, is actuated in response to engine speed to automatically shift from one regime of operation to the other.

The second regime which utilizes a quite different circuit and forms the subject matter of the above-identified application Serial No. 496,588, is utilized during the running or normal operation of the turbine at which time the starting circuit is disabled.

It has been found that, without this invention, in starting some turbines, even with anticipating circuits, the control is so sensitive that it cannot begin to cut back the fuel during starting until the temperature is within about 100° of the limiting temperature. The temperature rise during starting is so rapid, on occasion reaching over 100° per second, that the control, as indicated above, without this invention will have something less than a second in which to reduce fuel flow, stop the rapid rise of temperature and prevent serious over-shooting of the temperature limit. An object of the circuitry of this application is to provide a circuit with lower sensitivity below the critical temperature but with an anticipating feature which will, because of the anticipating feature, start reducing fuel flow while the temperature is still well below the critical or selected temperature. With the reduced sensitivity, or gain in the amplifier, the control can start to reduce fuel flow while the temperature is some 400° or 500° below the critical or selected temperature limit, giving the control 4 or 5 seconds to reduce the fuel flow and stop the rapid temperature rise. The circuitry does not change the sensitivity of the control above the selected temperature limit. By thus retaining the high sensitivity above the selected limit, when the temperature does start to over-shoot, the control can then rapidly decrease the fuel flow giving the maximum decrease of which the construction is capable for a small, say 100° temperature rise above the selected limit.

As shown in the drawings this invention has been applied to a turbine engine 12 having a compressor 14 driven by a turbine 16 and supplying compressed air to a combustion chamber 18 into which fuel is ejected from a fuel nozzle 20. A temperature responsive device such as a thermocouple 22 is arranged in the tail pipe of the turbine and supplies a temperature signal, which is compared with a reference voltage at 24, to supply a positive or negative temperature error signal to the amplifier 26. The amplifier is the well known chopper type D.C. amplifier having a vibrator 28 chopping the D.C. signal into a square wave which is fed to the amplifier 26. The amplifier output is again chopped by the synchronized chopper 30 and converted to a D.C. signal which is utilized in operating a fuel control mechanism. The choppers, amplifier, and fuel control mechanism are well known and, it is believed, need no further description here. Further details of this mechanism may, however, be found in the above-identified application Serial No. 496,588.

The turbine 12 drives a generator 32 which energizes a solenoid 34 to actuate switch 10 when the turbine speed reaches some preselected value such as 60% r.p.m. in the starting regime. Energization of the solenoid 34 will actuate switch 10 to ground contact 36 and unground contact 38 to disable the starting portion of the circuit and enable the running portion.

The amplifier 26, as shown in FIG. 1, has two distinct feedback branches, one, incorporating resistor 40, rectifier 42, condenser 44 and condenser 46, is the operating or running feed back forming the subject matter of the above-identified application while the feed back incorporating resistors 48, 50 and 52, condenser 54, rectifier 56 and condenser 58 forms a starting feedback incorporating the present invention.

Previous circuits have utilized a feedback incorporating a condenser and a resistor and, particularly, the time constant of that circuit for delaying the application of the full voltage of a negative feedback to an amplifier during a transient such as an increase in temperature so as to give the effect, at the output of an amplifier incorporating a feedback, of a much higher temperature than actually exists in the temperature pick-up. As soon as the condenser is charged or discharged, the full voltage of the negative feedback is again applied at the input of the amplifier to cut the output voltage down because of the negative feedback so as to register the input signal or the temperature error. The signal is thus distorted only during a transient so as to give an effect at the output of the amplifier different from the signal actually being registered by the temperature pick-up.

The condenser 58 is such a condenser and is utilized as an anticipator to assist in the prevention of overshooting of temperature limits by starting to cut-back the fuel or reduce fuel flow before the actual critical temperature is reached.

In the present structure, considering that the undertemperature error signal from the voltage comparer 24 is positive and that there is a voltage reversal in the amplifier 26 so that under-temperature output signals from the amplifier are negative, it will be apparent that the negative signal feed back through resistors 48 and 50, and, resistors 60 or 62 will be a negative feedback tending to reduce the input signal through the amplifier.

If the thermocouple is registering an undertemperature but the temperature is rapidly increasing as during starting, the condenser in the feedback circuit will be charged to a negative voltage, but the output of the amplifier will be changing towards a less negative voltage, which will in effect tend to discharge the condenser. Because of the time delay in the RC circuit, however, the condenser will slowly discharge and will present a negative signal to the input of the amplifier which in turn will tend to produce a positive signal at the output of the amplifier. It should be understood that there is a polarity reversal in the amplifier so that a temperature error input of positive polarity will appear at the amplifier output as a negative polarity; hence, under the above conditions it is possible for the discharging condenser applying a negative voltage to the amplifier input greater than the positive thermocouple under temperature error signal to produce a positive voltage at the amplifier output and thus initiate a fuel reducing action in the fuel control.

The above mechanism acts as an anticipator, but, as pointed out above even with the anticipator in the circuit the temperature rise is so rapid that there is not time enough to reduce the fuel flow during starting sufficient to prevent serious temperature overshooting. This is caused particularly by the fact that during starting there is a material undertemperature condition which is calling for an increase in fuel flow, or worded another way, during starting the fuel control mechanism will ordinarily call for maximum fuel flow and the temperature limiting mechanism is not effective to reduce this flow until the temperature limit has been reached or passed. Even with the anticipating feature described above, approximately one second is as much time as can be gained before the mechanism can start to cutback the fuel. During this undertemperature regime the amplifier is saturated and is putting out its maximum increase fuel signal, and, it is not until the undertemperature input signal is materially reduced that the amplifier can become unsaturated and start to produce a decrease fuel output signal or even a smaller increase fuel signal.

In the present invention, applicant has provided a second or parallel path in the feedback circuit utilizing resistor 52 and rectifier 56 as a path parallel to the resistors 48 and 50.

The sensitivity or gain or ratio of the output signal to the input signal of the amplifier is controlled by the resistance in the feedback. If there is no feedback, the amplifier will have a large output for a small temperature error; hence, the amplifier will become saturated with a small temperature error. With a negative feedback the sensitivity or gain of the amplifier in converting an input signal into an output signal is reduced, and the sensitivity or the ratio of the output signal to the input signal can be controlled, by the amount of resistance in the feedback. If the resistance in the feedback is low, the sensitivity or gain will be low. If the resistance in the feedback is high, the sensitivity or gain will be higher, and the higher the resistance the nearer the gain will approach the characteristics of the amplifier without any feedback.

The circuit of this application will, while retaining the anticipating features of the older circuits, render the circuit capable of more accurately governing the fuel flow while starting and thus more accurately control and limit the engine temperature during the starting cycle.

The convention used in this application is that the arrow in the rectifier indicates current flow from positive to negative as opposed to electron flow.

The present circuit incorporates a rectifier 56 and resistor 52 in parallel with the resistors 48 and 50 of the feed back circuit so that with amplifier output signals of one polarity, say negative (undertemperature), the rectifier will conduct and the entire circuit is rendered less sensitive i.e., more negative feedback is supplied.

The rectifier in effect changes the resistance in the feedback circuit giving a higher resistance when the amplifier output is positive and a lower resistance, because of the conduction of the rectifier, when the amplifier output is negative, thus rendering the amplifier less sensitive for undertemperature signals. Hence, for undertemperature signals a greater temperature error is possible before the amplifier becomes saturated to a degree where it will not respond to temperature changes (transients).

The rectifier 56 by conducting when the amplifier output is negative will reduce the resistance of the feedback circuit, resistance 52 preferably being materially less than the resistors 48 and 50 in addition to presenting a parallel path, so that the entire circuit is less sensitive and the amplifier will become unsaturated while the undertemperature error signal is much greater.

The operation of the rectifier is to provide separate feedback paths or branches for amplifier outputs of different polarity. Operation of the rectifier is that of a switch allowing feedback through resistors 48 and 50 of one branch for amplifier output of one polarity and through resistors 48 and 50 and resistor 52 in parallel therewith in another branch for output of the opposite polarity. The need for this type of feedback arrangement will be more easily explained with reference to FIG. 4. It will be noted that curve 64 representing amplifier output with a small amount of negative feedback, as determined by 48 and 50 in FIG. 1, indicates that although a high gain is obtained saturation of the amplifier limits the range of temperature change over which indication of temperature will be obtained. In certain cases it may be of greater importance to have a wide range of measurement than to have a high sensitivity over a narrow range e.g. in the case of starting a gas turbine engine where temperature change may be extremely fast and over a considerable range of temperature. Assume that the control or null point for the system is at 0 volt or slightly on the positive side in FIG. 4 and that the input signals change sense on opposite sides of the null point, i.e., the point which the system seeks and that at which temperature is to be limited as by cutting back fuel flow in the case of a gas turbine, and that a lag feedback affording anticipation of temperature change is attendant to the amplifier as in FIG. 1. With the extreme change mentioned above there may be insufficient time notwithstanding anticipation to prevent harmful temperature overshoot. This occurs because, looking at FIG. 4, the system does not measure until it becomes unsaturated at point X and then has only the instant of time elapsing before the temperature reaches the control point to reduce fuel flow. Curve 5 illustrates the characteristic provided by increasing the feedback signal for a negative amplifier output. This is accomplished by making 52 less than 50, 48 and arranging rectifier 56 such that the feedback signal passes through 50, 48 when amplifier output is positive and through 52 and 50, 48 in parallel when negative. The increase in the range of measurement, by giving the control more time to respond, enables it to prevent overshoot. The control is sensitive to the rate of temperature change at a much lower temperature than previously.

Curves of FIGS. 4 and 5 are independent of the rate of temperature change, i.e., do not show the effect of the anticipating condenser 58. The effect of the condenser with rapidly increasing temperature is shown by the dotted line 66 in FIG. 5, showing how the discharging condenser 58 will supply a negative voltage to the amplifier input greater than the rapidly diminishing positive undertemperature signal of the thermocouple to thus produce a positive fuel reducing output signal while the thermocouple is still indicating an undertemperature condition.

In increasing temperature from an undertemperature condition as soon as the output of the amplifier becomes positive, the rectifier will, of course, cease to conduct which will in effect increase the resistance of the feedback, but this will only serve to increase the R.C. time constant of its condenser circuit and further delay the discharging of the condenser and thus prolong or increase the fuel reducing output signal of the amplifier.

The structure thus far described utilizes a condenser 58 in the feedback circuit such as shown in FIG. 2. It has been found that condenser 58, because of the necessity of its being large for satisfactory operation during the rapid changes from the larger undertemperature conditions, is unable to provide good steady-state operation. That is, after the limiting temperature has been reached and the fuel supply reduced sufficiently to prevent further increases in temperature, the system tends to oscillate or hunt because the large condenser in the feedback circuit makes the dynamic gain of the control high enough that the system is unstable. To correct this condition, the size of condenser 58 has been considerably decreased and a second condenser 54, as shown in FIG. 1, has been incorporated in the parallel circuit containing the rectifier. Current flows through the rectifier and its associated parallel circuit only when the amplifier output indicates an undertemperature condition, i.e., a negative signal. And since the two condensers act in an additive manner the desired capacitance value for good response is obtained during rapid change of temperature from an undertemperature to an overtemperature condition during starting. When the temperature has reached the control or null point and good response for small errors is desired as the system seeks the null point, the current flows only through the other parallel circuit incorporating resistors 48 and 50, and only the condenser 58 is operative. In this circuit the condenser 58 can be materially smaller and will hence produce less lag and give a good response during the steady-state phase of the operation.

FIG. 3 illustrates an alternative method of providing the characteristic illustrated by FIG. 5. Rectifier 68 and resistance 70 are added as a branch circuit to a plain feedback circuit incorporating resistors 72 and 74 and a capacitor 58. When the amplifier output is negative indicating undertemperature, resistor 70 and rectifier 68 will be ineffective since there will be no flow through the rectifier 68. The curve for the minus or undertemperature side will be the same as curve 76 of FIG. 5 and will be determined by the value of resistors 72 and 74. When the amplifier output becomes positive the rectifier 68 will conduct and bleed-off some of the positive feedback voltage thereby reducing the extent of negative feedback and thereby increasing the amplifier gain and providing values on the positive side which will give a curve similar to curve 64 of FIG. 5.

From the above description it will be apparent that by incorporating a rectifier in the feedback circuit of the amplifier in the fuel limiting control of a turbine engine I am able to anticipate a fuel reduction requirement on a rapid rise in temperature and increase the time in which this control may act to reduce fuel while maintaining the sensitivity of the control for overtemperature conditions.

It should be understood that the invention is not limited to the specific embodiment herein illustrated and described, but may be used in other ways without departure from the spirit as defined by the following claims.

I claim:

1. A D.C. amplifying system amplifying a D.C. electrical input signal having negative and positive values into a D.C. output signal having negative and positive values and having a negative feed back from the D.C. output to the D.C. input of the system, an impedance in said D.C. feed back limiting the amount of feed back, a rectifier in said D.C. feedback connected in parallel with said impedance and reducing the impedance of said feed back circuit for feed back signals of one polarity and substantially ineffective for signals of the opposite polarity.

2. In a fuel control system for a turbine engine, fuel limiting means responsive to fuel control signals, including a starting system having selected control characteristics, said starting system including engine temperature responsive means providing temperature responsive signals, means for producing electrical temperature error signals of positive and negative polarity from said temperature responsive signals, an amplifier for said temperature error signals providing fuel control signals and a negative feed back circuit having one branch including a resistor connecting the amplifier output with the amplifier input and a second branch including a rectifier in the feedback circuit for decreasing the effectiveness of feedback signals of one polarity over those of the other polarity.

3. A control as claimed in claim 2 in which the rectifying circuit increases the feed back strength for negative signals and has substantially no effect on the feed back strength for positive signals from the amplifier.

4. A device as claimed in claim 2 in which the rectifier in the feed back circuit includes a rectifier connected with ground for bypassing a portion of the feed back signal of a selected polarity.

5. A device as claimed in claim 2 including a shunt condenser in the feed back circuit for providing anticipating signals.

6. A device as claimed in claim 2 in which the feed back circuit comprises two parallel branches one of which incorporates said resistances and the other of which incorporates said rectifier.

7. A device as claimed in claim 6 including a shunt condenser in the resistance branch and a separate shunt condenser in the rectifier branch.

8. In a fuel system for a turbine engine starting system, fuel limiting means having selected control characteristics, engine temperature responsive means providing engine temperature responsive signals, means producing electrical temperature error signals of positive and negative polarity from said temperature responsive signals as said engine temperature varies in one direction or the other from a selected engine temperature, an amplifier for said error signals converting said error signals into fuel control signals of negative and positive polarity, and a negative feedback for said amplifier, said negative feedback comprising a branched circuit having one branch including a resistance connecting the amplifier output with the amplifier input and a second branch including a rectifier in said feedback circuit.

9. In a fuel control system for a turbine engine, fuel limiting means including engine temperature responsive means providing D.C. temperature responsive error signals of opposite polarity on opposite sides of a selected temperature, an amplifier for said temperature error signals converting said D.C. error signals into D.C. fuel control signals of opposite polarity and a D.C. negative feedback connecting the output with the input of said amplifier for feeding a portion of said fuel control signals back to be combined with said error signals including means in said D.C. feedback for decreasing the ratio of D.C. error signals to D.C. control signals of one polarity over said ratio of the other polarity.

10. In mechanism for controlling a selected condition of a device, a control system of the null seeking type having means responsive to an input signal, varying with said condition, to yield an output control signal for controlling said condition and returning said condition to a selected value and said input signal to zero, in which system the input signals responsive to said condition are zero at said selected condition value to provide the null point and change sense on opposite sides of the null point, said system having means converting each said input signal into a corresponding output signal, said converting means including means producing an output signal which is a predetermined ratio of each input signal from zero to a selected value on one side of said null point and including means modifying the relation between the input and output signal on the other side of the null point and producing an output signal of a different predetermined ratio of each input signal from zero to a preselected value on the other side of said null point.

References Cited in the file of this patent
UNITED STATES PATENTS

| | | |
|---|---|---|
| 2,222,933 | Blumlern | Nov. 26, 1940 |
| 2,224,699 | Rust | Dec. 10, 1940 |
| 2,256,071 | Bruck | Sept. 16, 1941 |
| 2,459,730 | Williams | Jan. 18, 1949 |
| 2,544,340 | Maxwell | Mar. 6, 1951 |
| 2,581,124 | Noe | Jan. 1, 1952 |
| 2,662,372 | Offner | Dec. 15, 1953 |
| 2,684,999 | Goldberg et al. | July 27, 1954 |
| 2,709,205 | Colls | May 24, 1955 |
| 2,715,209 | Williams et al. | Aug. 9, 1955 |
| 2,734,340 | Wood | Feb. 14, 1956 |
| 2,741,668 | Iffland | Apr. 10, 1956 |
| 2,744,969 | Peterson | May 8, 1956 |
| 2,764,867 | Farkas | Oct. 2, 1956 |
| 2,832,017 | Evans | Apr. 22, 1958 |
| 2,862,355 | Davis et al. | Dec. 2, 1958 |
| 2,885,612 | Larsen | May 5, 1959 |

FOREIGN PATENTS

| | | |
|---|---|---|
| 682,049 | Great Britain | Nov. 5, 1952 |